US010218908B2

(12) United States Patent
Uemura

(10) Patent No.: US 10,218,908 B2
(45) Date of Patent: Feb. 26, 2019

(54) IMAGE PROCESSING APPARATUS CAPABLE OF PERFORMING IMAGE SHAKE CORRECTION, IMAGE PICKUP APPARATUS, AND CONTROL METHOD

(71) Applicant: CANON KABUSHIKI KAISHA, Tokyo (JP)

(72) Inventor: Hidetaka Uemura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 15/404,711

(22) Filed: Jan. 12, 2017

(65) Prior Publication Data
US 2017/0208250 A1    Jul. 20, 2017

(30) Foreign Application Priority Data

Jan. 14, 2016 (JP) .................... 2016-005483

(51) Int. Cl.
  *H04N 5/228*  (2006.01)
  *H04N 5/232*  (2006.01)
  *H04N 5/77*   (2006.01)
  *H04N 5/217*  (2011.01)

(52) U.S. Cl.
  CPC ..... *H04N 5/23254* (2013.01); *H04N 5/23245* (2013.01); *H04N 5/23267* (2013.01); *H04N 5/23293* (2013.01); *H04N 5/77* (2013.01); *H04N 5/772* (2013.01)

(58) Field of Classification Search
  CPC ........... H04N 5/23251; H04N 5/23254; H04N 5/23264; H04N 5/23267; H04N 5/23274; H04N 5/23293; H04N 5/23245; H04N 5/77; H04N 5/772
  See application file for complete search history.

(56) References Cited

U.S. PATENT DOCUMENTS

| 7,800,678 | B2 * | 9/2010 | Hoshino | H04N 5/23248 348/208.1 |
| 8,508,605 | B2 * | 8/2013 | Dolgin | H04N 5/23248 348/208.1 |
| 9,117,271 | B2 * | 8/2015 | Habuka | G06T 5/003 |
| 9,525,821 | B2 * | 12/2016 | Chang | H04N 5/23267 |
| 9,628,712 | B2 * | 4/2017 | Fujita | H04N 5/23267 |
| 9,639,913 | B2 * | 5/2017 | Satoh | H04N 5/23248 |

(Continued)

FOREIGN PATENT DOCUMENTS

JP    06-139746 A    5/1994

*Primary Examiner* — Ngoc Yen T Vu
(74) *Attorney, Agent, or Firm* — Cowan, Liebowitz & Latman, P.C.

(57) ABSTRACT

A digital video camera comprising a memory that temporarily stores a video image including any number of frames is provided. The digital video camera outputs a video image of a first frame to a first signal path and outputs a video image of a second frame that is a frame earlier than the first frame in the memory to a second signal path. The digital video camera calculates a first correction amount used for correcting an image shake relating to the video image of the second frame based on the video image of the first frame output to the first signal path. Subsequently, the digital video camera corrects the image shake relating to the video image of the second frame by cutting out a predetermined region from the video image of the second frame based on the first correction amount.

22 Claims, 10 Drawing Sheets

(56) References Cited

U.S. PATENT DOCUMENTS

2012/0314093 A1* 12/2012 Tamayama .............. G06T 5/003
                                                     348/208.1
2013/0208143 A1*  8/2013 Chou .................... H04N 1/212
                                                     348/231.99

* cited by examiner

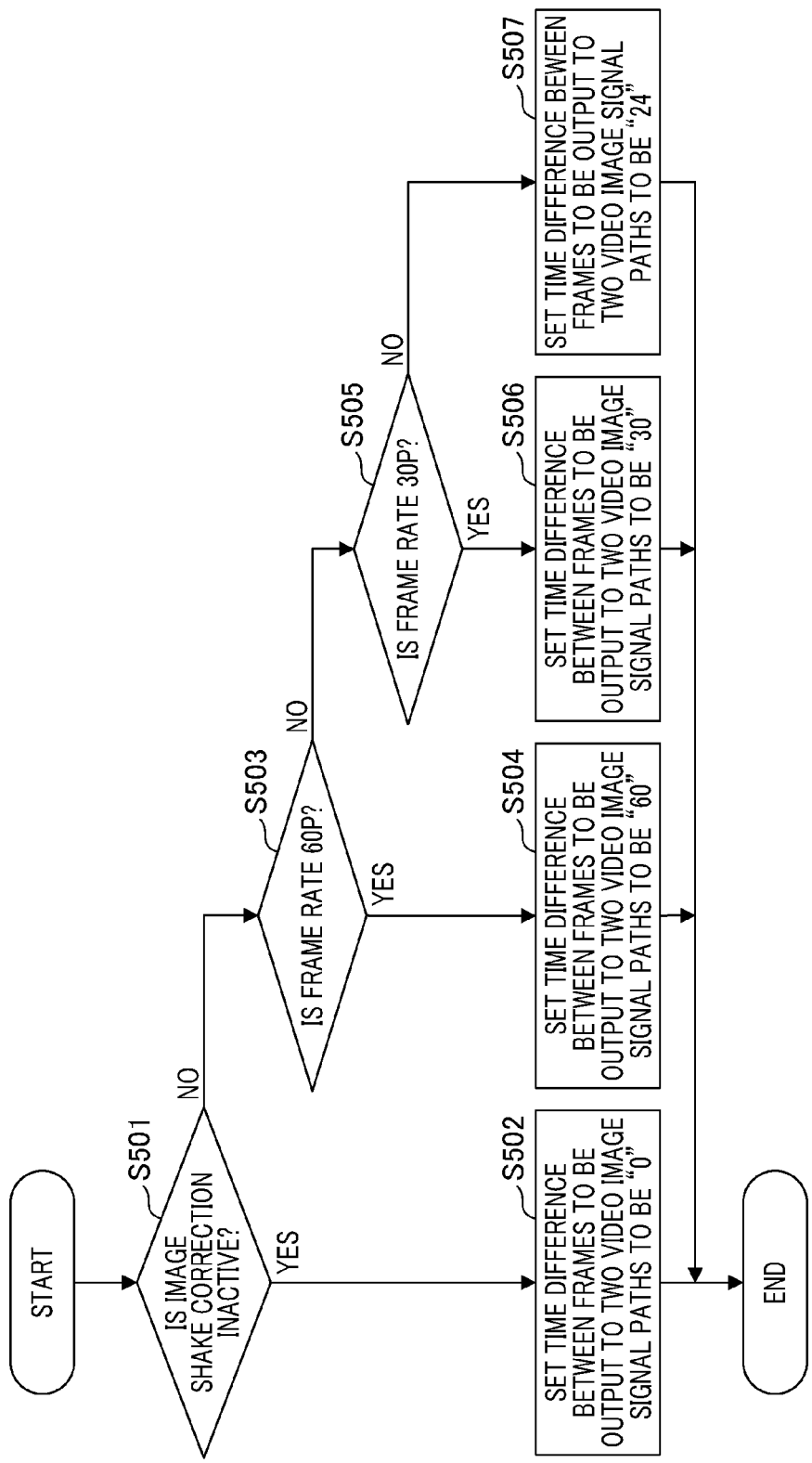

IMAGE PROCESSING APPARATUS CAPABLE OF PERFORMING IMAGE SHAKE CORRECTION, IMAGE PICKUP APPARATUS, AND CONTROL METHOD

BACKGROUND OF THE INVENTION

Field of the Invention

The present invention relates to an image processing apparatus, an image pickup apparatus, and a control method.

Description of the Related Art

In an image pickup apparatus for shooting still images and moving images, an image stabilization function that corrects an image shake caused by hand shaking during shooting has widely been used. The image stabilization function during shooting includes an optical image stabilization that optically corrects the image shake by using a lens and an electronic image stabilization that electronically corrects the image shake by changing a read-out position or a cut-out position of a video signal obtained in shooting. However, the image stabilization performance in shooting has a limit, and considerable residual blur occurs. In particular, it is difficult to determine whether the shaking applied to the apparatus is due to either hand shaking or shaking caused by a deliberate motion of a photographer, and a video image with an ambiguous motion often remains uncorrected.

A reproducing apparatus has been proposed that has an image stabilization function in reproducing, that can electronically correct the image shake by determining a cut-out position of an image based on a vector amount of the image and by enlarging and reproducing the cut-out image, in a case where the recorded video image is reproduced.

Japanese Patent Application Laid-Open Publication No. H06-139746 discloses a reproducing apparatus that stores motion vectors for each frame detected during shooting in a memory, and performs a desired image correction based on the information about the motion vectors in the reproduction. According to this reproducing apparatus, pre-reading in the future direction is possible, and it is possible to determine that the vibration applied to the apparatus is due to either the hand shaking or the deliberate motion. Additionally, an image-pickup apparatus has been proposed in which once all the shot video images are temporarily stored in shooting, and a video image to which the image shake correction has been applied by using the image stabilization function in reproducing is regularly stored in response to a reproduction speed designated by the user.

In the prior art, if the video image is reproduced by using a reproducing apparatus not having the image stabilization function in reproducing, the video image is reproduced in which an image shake remains. Additionally, the image-pickup apparatus in which once all the shot video images are temporarily stored in shooting, and the video image to which the image shake correction has been applied by using the image stabilization function in reproducing is regularly stored in response to the reproduction speed designated by the user, needs a large-capacity memory for temporarily storing all the obtained video images. Accordingly, the capacity of the memory may limit a period for video images to be recorded. Furthermore, rendering time for regularly recording the video image that has been temporarily stored is needed, so that the enormous rendering time is needed depending on the length of the video image that has been temporally stored.

Additionally, in the image stabilization function in reproducing, there are cases in which a deterioration in the image quality is caused by an electronic enlargement of the image and a chipping of an object due to the change of an field angle occurs in response to the shift of the object toward a telephoto side by the cut-out operation of the image.

SUMMARY OF THE INVENTION

The present invention provides an image processing apparatus that can realize a function that is similar to an image stabilization function in reproducing and is applied during shooting, without the need for a large capacity memory.

An image processing apparatus of one embodiment of the present invention comprises: a temporary storage unit configured to temporarily store a video image including any number of frames; an output control unit configured to output a video image of a first frame to a first signal path and output a video image of a second frame that is a frame earlier than the first frame that is temporarily stored in the temporary storage unit to a second signal path; a first correction amount calculating unit configured to calculate a first correction amount used for correcting an image shake relating to the video image of the second frame based on the video image of the first frame output to the first signal path; and a first image shake correction unit configured to correct the image shake relating to the video image of the second frame by cutting out a predetermined region from the video image of the second frame based on the first correction amount.

Further features of the present invention will become apparent from the following description of exemplary embodiments (with reference to the attached drawings).

BRIEF DESCRIPTION OF THE DRAWINGS

FIG. 5 illustrates a process for changing a time difference between frames to be output to a video image signal path.

DESCRIPTION OF THE EMBODIMENTS

First Embodiment

Figure 1:
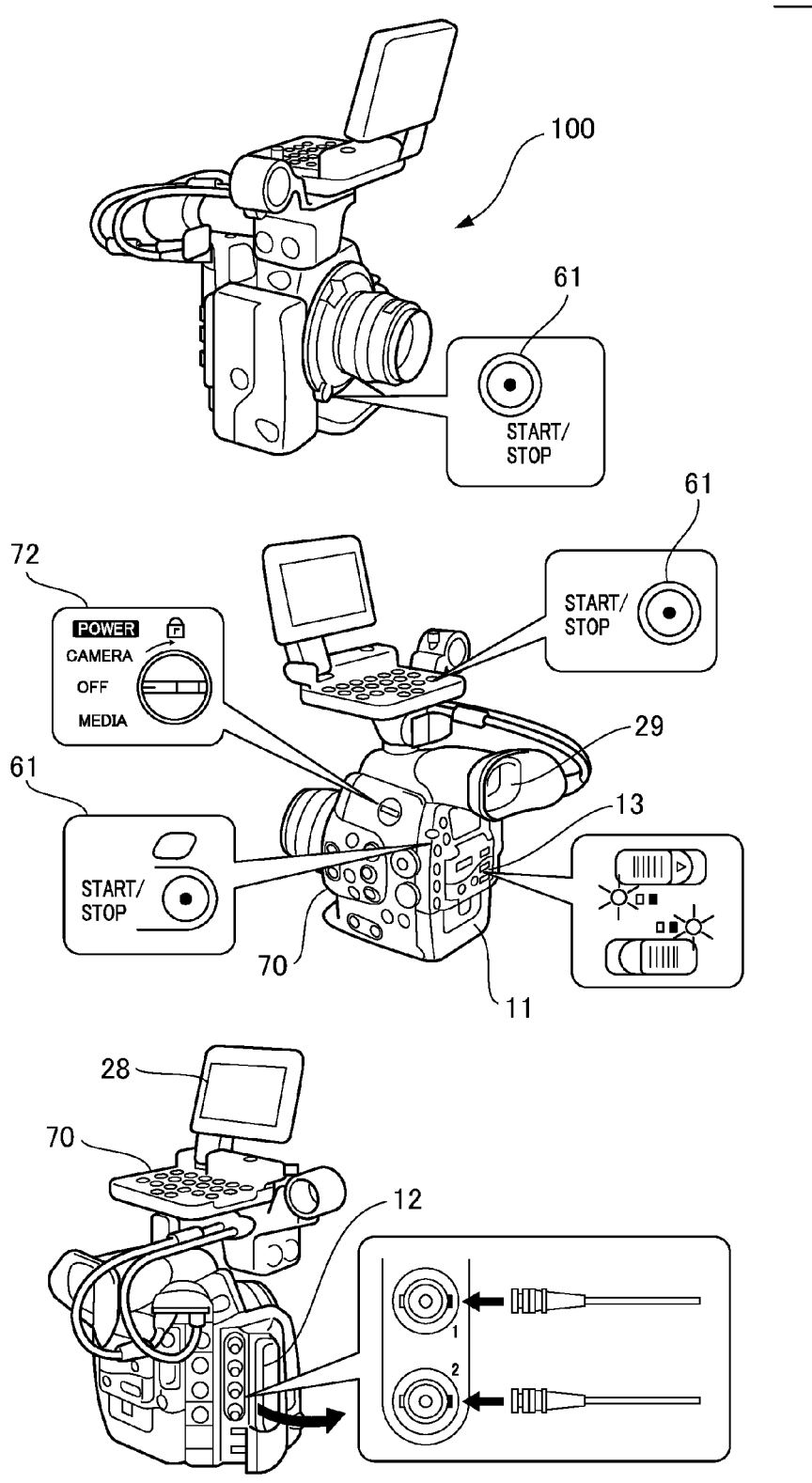
FIG. 1 illustrates an external view of an image processing apparatus of the present embodiment.

FIG. 1 illustrates an external view of an image processing apparatus of the present embodiment. The image processing apparatus shown in FIG. 1 is a lens-interchangeable digital video camera 100 (hereinafter, simply referred to as a "digital video camera") serving as an example of image pickup apparatuses. Note that the present invention is not limited to the present embodiment, and the present invention is also applicable to a single-lens reflex camera, a lens-integrated compact camera, a camera function-equipped mobile phone, and the like.

A monitor 28 and a viewfinder 29 shown in FIG. 1 are included in a display unit 107 (FIG. 2) that displays an image and various information. A trigger button 61 is an operation button for providing a photographing instruction. A power/mode switch 72 is an operation button for switching power-on/power-off and a shooting mode/a reproducing mode. An operation panel 70 has operation members such as various switches, buttons and the like that receive various operations from a user. A connector 12 outputs a video image signal to an external monitor or an external recording device from the digital video camera 100, and configures an external output interface unit 120. Additionally, a battery cover 11 holds a loaded battery. An access lamp 13 displays a status of a card slot for recording, and is included in the display unit 107.

Figure 2:
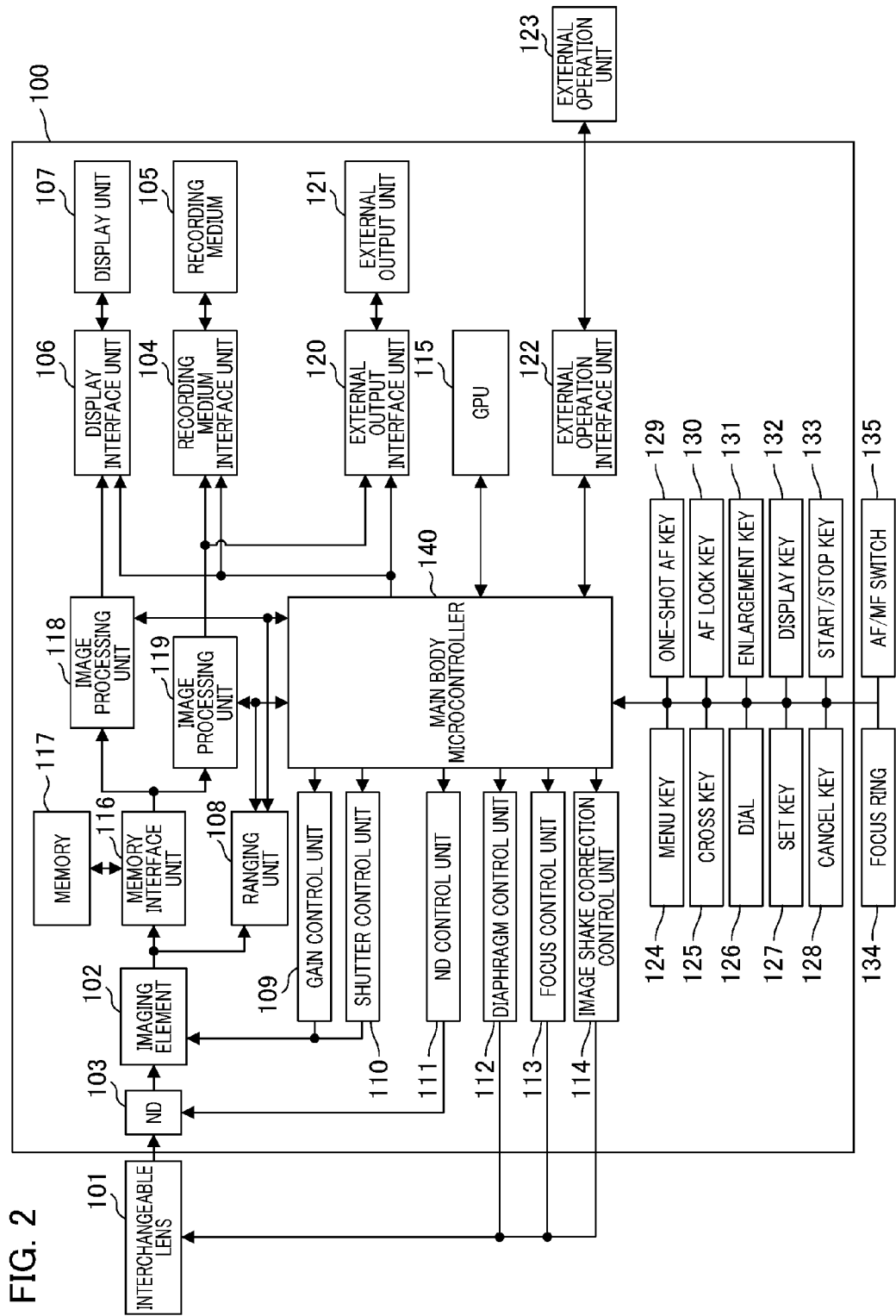
FIG. 2 illustrates a configuration example of a digital video camera.

FIG. 2 illustrates a configuration example of the digital video camera shown in FIG. 1. Note that one or more of the functional blocks included in the digital video camera 100 may be realized by hardware such as an application specific integrated circuit (ASIC), a programmable logic array (PLA), or the like. Additionally, one or more of the functional blocks may also be realized by causing a programmable processor such as a central processing unit (CPU), a micro processing unit (MPU), or the like to execute software. Furthermore, one or more of the functional blocks may also be realized by a combination of software and hardware. Hence, in the following description, even if the different functional blocks are described as an operation subject, the same hardware may be realized as the subject.

Various operation units, the display unit 107, and an external output unit 121 included in the digital video camera 100 are provided to be exposed at the surface of the digital video camera 100. An interchangeable lens 101 is a shooting lens having a plurality of lens groups. The interchangeable lens 101 comprises a focus lens, a zoom lens, and a shift lens provided in the inside thereof, and further includes a diaphragm. A neutral density (ND) filter 103 is provided separately from the diaphragm disposed in the lens in order to adjust a quantity of incident light.

An imaging element 102 has a configuration in which a plurality of pixels, each having a photoelectric conversion element, is two-dimensionally arranged. The imaging element 102 performs photoelectric conversion of an object light of an object formed by the interchangeable lens 101 for each pixel, and further performs analog-to-digital conversion by an A/D conversion circuit, and outputs a signal relating to the video image (RAW image data).

A memory interface unit 116 writes the RAW image data for all pixels output from the imaging element 102 in a memory 117, and in addition, reads out the RAW image data stored in the memory 117, and outputs the RAW image data to an image processing unit 118 and image processing unit 119. The memory 117 is a volatile temporary storage unit that temporarily stores the RAW image data (video image) for all pixels of any number of frames.

The image processing units 118 and 119 perform image processing that corrects a level difference caused by the imaging element 102, with respect to the RAW image data for all pixels transferred from the memory interface unit 116. The image processing units 118 and 119 correct a pixel level in an active region, for example, by using the pixel in an optical black (OB) region, and in addition, perform correction on a defective pixel by using the surrounding pixels. Additionally, the image processing units 118 and 119 perform each process such as correction of decreased marginal illumination, color correction, edge enhancement, noise reduction, gamma correction, debayering, compression, and the like. The image processing units 118 and 119 perform the above processes on the RAW image data that has been input from the imaging element 102, and output the image data.

A main body microcontroller 140 is provided with a CPU, a read-only memory (ROM), a random access memory (RAM), and the like. The CPU loads by developing a program stored in the ROM to a work area of the RAM, and thereby the main body microcontroller 140 controls the operation of the entire digital video camera. Additionally, the main body microcontroller 140 executes a program stored in the ROM, and realizes each process of the present embodiments to be described below. Specifically, the main body microcontroller 140 refers to the image data output from the image processing units 118 and 119, calculates a motion vector of the object, and performs a process that cancels out an image shake based on the calculated motion vector (electronic image stabilization processing).

The RAM loads constants and variables for the operation of the main body microcontroller 140, and a program read out from the ROM. A recording medium interface unit 104 is an interface between a recording medium 105 and the digital video camera, controls the recording of the image data input from the image processing unit 119, in the recording medium 105, and controls the read-out of the image data from the recording medium 105. The recording medium 105 is a recording means that records a video image to be recorded in the body of the digital video camera. The recording medium 105 is configured by, for example, a semiconductor memory or the like. The recording medium 105 executes the recording of the video image and the read-out of the recorded video image, in response to the control by the recording medium interface unit 104.

The display interface unit 106 performs superimposed compositing and resizing processing on the video image data from the image processing unit 118 and a VRAM (Video RAM) drawn by a graphics processing unit (GPU) 115. The display interface unit 106 outputs the video image that has undergone the superimposed compositing and the resizing processing, to the display unit 107. The video image output to the display unit 107 is for a confirmation in the body of the digital video camera. If the enlarged display mode is active due to the main body microcontroller 140, the display interface unit 106 performs the superimposed compositing and the resizing processing on a partial region of the video image data. As a result, in the enlarged display mode, the video image that is enlarged more than in the normal time is displayed on the display unit 107, and thereby a photographer can easily perform a manual focus (MF) adjusting operation more accurately.

The display unit 107 is a monitor or a viewfinder that displays the image data that output from the display interface unit 106 for confirmation of the field angle. The GPU 115 is a rendering engine that draws various information displays of the video camera, and the menu screen to the VRAM. The GPU 115 comprises a drawing function for a drawing and a rotation, and a layer compositing function, in addition to a drawing function for the character strings and figures. The drawn VRAM includes an alpha channel representing transparency which may be on-screen displayed on the video image by the display interface unit 106.

A gain control unit 109, a shutter control unit 110, an ND control unit 111, and a diaphragm control unit 112, which will be described below, are all blocks for an exposure control. These control units are controlled by the main body microcontroller 140 based on the result for the calculation of the brightness level of the image data output from the image processing unit 118 or the image processing unit 119 by using the main body microcontroller 140, or based on operating parameters manually set by the photographer. At this time, the calculation based on the image data output from one of the image processing units with a smaller frame delay brings control that is excellent in responsiveness.

The gain control unit 109 controls a gain of the imaging element 102. The shutter control unit 110 controls a shutter speed of the imaging element 102. The ND control unit 111 controls a quantity of light incident to the imaging element 102 through the ND filter 103.

The diaphragm control unit 112 controls the diaphragm of the interchangeable lens 101. A focus control unit 113 operates differently depending on whether a focus driving state held in the main body microcontroller 140, AF (auto focus), or MF (manual focus). If the focus driving state is MF, the focus control unit 113 stops the control. In this case, the photographer rotates a focus ring 134 incorporated in the interchangeable lens, and thereby any focus adjustment can be performed.

If the focus driving state is AF, the main body microcontroller 140 calculates the focus information based on the image data output from the image processing unit 118 or the image processing unit 119. The focus control unit 113 controls the focus lens inside of the interchangeable lens 101 based on the calculated focus information. The main body microcontroller 140 also can set an AF frame in a partial region of the image data and calculate the focus information based on only the object in the AF frame. At this time, the calculation based on the image data output from one of the image processing units with a smaller frame delay brings control that is excellent in responsiveness.

The AF has two operation modes. One is a one-shot AF mode. The one-shot AF mode is a mode that performs AF control only in a case that a one-shot AF key 129 is pressed down, and stops the control of the focus control unit 113 after determination of whether focus is successful or failed. The other is a mode that always performs the AF control, which is referred to as a "servo AF mode" or a "continuous AF mode". However, even in the continuous AF mode, the control of the focus control unit 113 stops during an AF lock state by pressing down an AF lock key 130. Switching between the two modes is performed by changing settings change in the menu screen.

The main body microcontroller 140 calculates a motion vector of the object based on the image data output from the image processing unit 118 or the image processing unit 119. An image shake correction control unit 114 performs optical image stabilization processing that controls the shift lens inside the interchangeable lens 101 so as to cancel out the image shake based on the calculated motion vector. Alternatively, the image shake correction control unit 114 performs the electronic image stabilization processing that cuts out images in each frame of the moving image in a direction to cancel out the image shake. At this time, the calculation from the image data output from one of the image processing units with a smaller frame delay brings control that is excellent in responsiveness.

The external output interface unit 120 performs the resizing processing on the video image data from the image processing unit 119. Additionally, the external output interface unit 120 performs signal conversion and imparting of a control signal that are appropriate to the standard of the external output unit 121, and outputs to the external output unit 121. The external output unit 121 is a terminal that outputs the video image data for the recording to an external device. The external output unit 121 is, for example, a serial digital interface (SDI) terminal and an High-Definition Multimedia Interface (HDMI (registered trademark)) terminal. A monitor display or an external recording device can be connected to the external output unit 121.

An external operation interface unit 122 receives control instructions from an external operation unit 123 and make notification thereof to the main body microcontroller 140. For example, the external operation interface unit 122 is an infrared remote-control photoreceptor, a wireless local area network (LAN) interface, and a Local Application Control Bus System (LANC (registered trademark)).

The external operation unit 123 transmits control instructions to the external operation interface unit 122. The external operation unit 123 can transmit instructions corresponding to operations of the operation units such as a menu key 124 through an AF/MF switch 135 included in the digital video camera 100 and the interchangeable lens 101. Additionally, the external operation unit 123 can transmit the information for changing settings on the menu screen displayed on the display unit 107.

The menu key 124 through the AF/MF switch 135 are operation units, and include members such as a key (button), a dial, a tact switch, a ring, and so forth. All of these serve to accept operations performed by the photographer and notify the main body microcontroller 140 about the control instructions. The menu key 124 through a START/STOP key 133 are assembled in the digital video camera 100, and the focus ring 134 and the AF/MF switch 135 are assembled in the interchangeable lens 101. A port of these operation units can have their roles exchanged or be assigned to other functions by setting made in the menu screen.

The menu key 124 provides an instruction to display the menu screen on the display unit 107, or provides an instruction to close the menu screen that has already been open. A cross key 125 and a dial 126 provide an instruction to move a cursor for selecting an item in the menu screen and provide an instruction to move a frame display relating to focusing in a direction desired by the photographer. A SET key 127 provides an instruction to select an item that is being indicated by the cursor in the menu screen or to decide various setting operations.

A cancel key 128 provides an instruction to return to the one hierarchical previous to currently-selected hierarchical level of the menu screen, or to discard the various setting operations. The one-shot AF key 129 provides an instruction for AF driving by the focus control unit 113 if the AF mode is the one-shot AF. The AF lock key 130 provides an instruction to stop the control by the focus control unit 113 if the AF mode is the continuous AF, or cancel the control stopped state. An enlargement key 131 provides an instruction to enlarge the video image displayed on the display unit 107 or to return to the original size. A DISPLAY key 132 provides an instruction to change a Display level held in the main body microcontroller 140. Display of various information displayed on the display unit 107 is restricted based on the selected Display level, so that more detailed information can be displayed or the video image can be displayed more clearly.

The START/STOP key 133 provides an instruction to start and stop recording by the recording medium interface unit 104. The focus ring 134 is used to move the focus lens in the interchangeable lens 101 if the focus driving state is MF, so that focus adjustment can be performed. The AF/MF switch 135 is used to switch the focus driving state between AF and MF.

Figure 3:
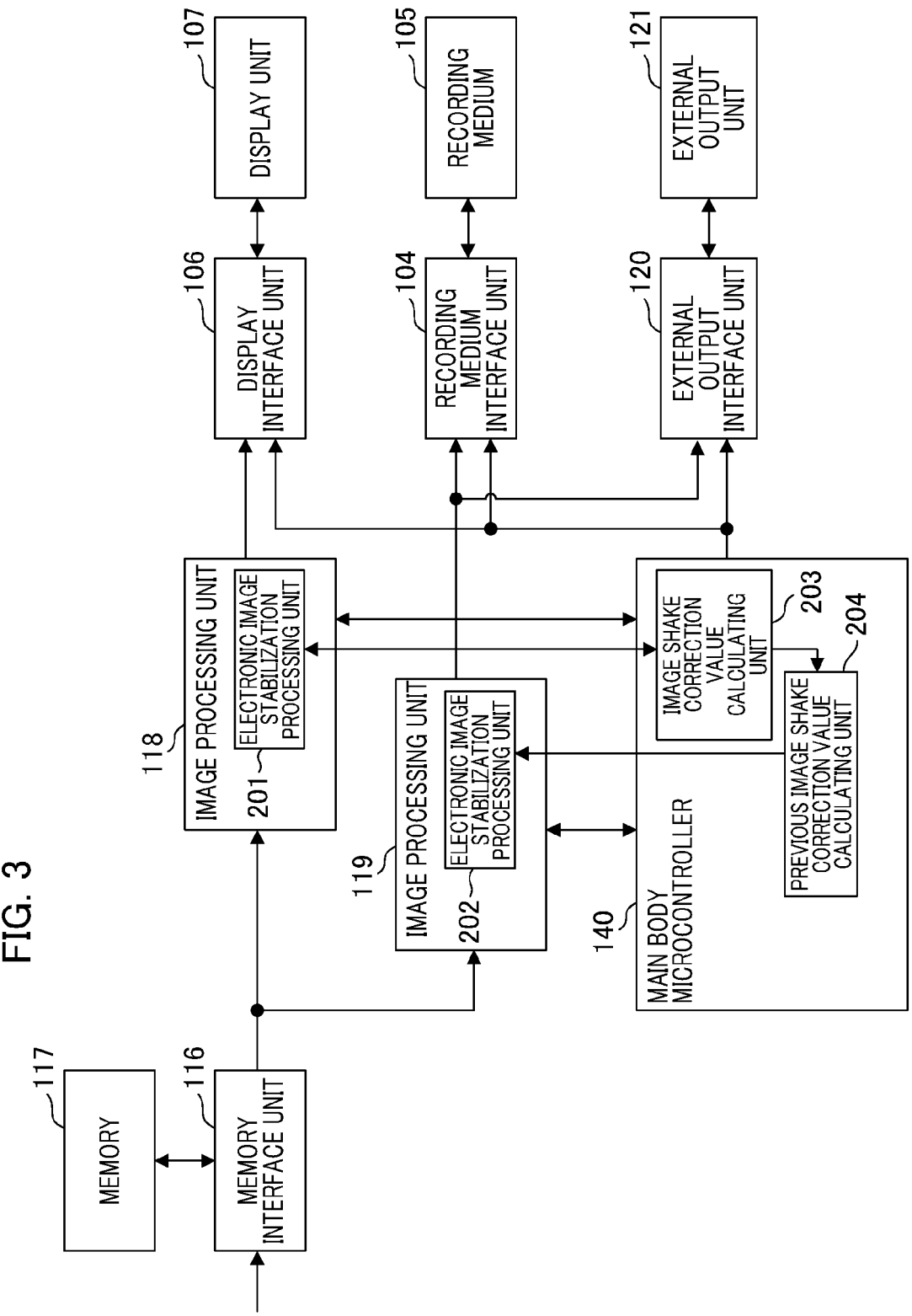
FIG. 3 is a functional block diagram of the image processing apparatus of a first embodiment.

FIG. 3 is a functional block diagram of the image processing apparatus of the first embodiment. In FIG. 3, among the functional configuration examples of the digital video camera 100, a configuration relating to control regarding electronic image stabilization is explained.

The memory interface unit 116 writes the RAW image data for all pixels output from the imaging element 102, in the memory 117. Additionally, the memory interface unit 116 functions as an output control means that reads out the RAW image data held in the memory 117 and outputs to the image processing units 118 and 119. The memory 117 is a volatile storage medium that stores the RAW image data for all pixels of a few frames. The memory interface unit 116 outputs the RAW image data of a first frame (the Nth frame) that is newer than the frame to be output to the image processing unit 119 to the image processing unit 118, and accordingly, outputs this RAW image data to the first signal path. The first signal path is a video image signal path passing through the image processing unit 118. The display unit 107 is connected to the first signal path. The memory interface unit 116 outputs the RAW image data of a second frame (the (N-M)th frame) that is older than a frame to be output to the image processing unit 118 to the image processing unit 119, and accordingly, outputs this RAW image data to the second signal path. The second signal path is a video image signal path through the image processing unit 119. The recording medium 105 and the external output unit 121 are connected to the second signal path. Note that a configuration may be adopted in which the external output unit 121 functions as an external display means that displays the video image for confirmation on the external device. If this configuration is adopted, the external output unit 121 is connected to the first signal path. Obviously, the digital video camera 100 may comprises the external display means connected to the first signal path, separately from the external output unit 121.

The image processing unit 118 performs image processing that corrects the level difference caused by the imaging element 102, with respect to the RAW image data for all pixels output from the memory interface unit 116. Subsequently, an image shake correction value calculating unit 203 included in the main body microcontroller 140 calculates a motion vector of the object based on the image data output from the image processing unit 118. The image shake correction value calculating unit 203 calculates a second correction amount that is used for canceling out the image shake, based on the calculated motion vector (which functions as a second correction amount calculating means). Subsequently, an electronic image stabilization processing unit 201 provided inside of the image processing unit 118 receives the second correction amount from the image shake correction value calculating unit 203, and performs the electronic image stabilization processing based on the received second correction amount so as to cancel out the image shake. Specifically, the electronic image stabilization processing unit 201 corrects the image shake relating to the video image of the first frame, by cutting out a predetermined region from the video image of the first frame (which functions as the second image shake correction means). The electronic image stabilization processing unit 201 outputs the RAW image data in which the image shake is canceled out to some extent to the display interface unit 106.

The display interface unit 106 performs the superimposed compositing and resizing processing on the video image data in which the image shake has been canceled out to some extent by the image processing unit 118 and on the VRAM (Video RAM) drawn by the GPU 115, and outputs the image data to the display unit 107. The display unit 107 is a monitor or a viewfinder that displays the image data output from the display interface unit 106 for confirmation of the field angle.

The image processing unit 119 performs image processing that corrects the level difference caused by the imaging element 102, with respect to the RAW image data for all pixels output from the memory interface unit 116. A previous image shake correction value calculating unit 204 receives the calculation result (motion vector) by the image shake correction value calculating unit 203, up to a frame (the N-th frame) later than the (N-M) frame input to the image processing unit 119. The previous image shake correction value calculating unit 204 then calculates a first correction value used for correcting the image shake on the video image of the (N-M) frame based on the received motion vector (which functions as a first correction amount calculating means). Subsequently, an electronic image stabilization processing unit 202 performs the electronic image stabilization processing based on the first correction amount calculated by the previous image shake correction value calculating unit 204 so as to cancel out the image shake. Specifically, the electronic image stabilization processing unit 202 corrects the image shake relating to the video image of the second frame by cutting out the predetermined region from the video image of the second frame (which functions as the first image shake correcting means). The electronic image stabilization processing unit 202 outputs the RAW image data in which the image shake has appropriately been canceled out on the video image of the second frame, to the recording medium interface unit 104 and the external output interface unit 120.

The recording medium interface unit 104 records the video image data after the image shake has appropriately been canceled out by the image processing unit 119 on the recording medium 105. The external output interface unit 120 performs the resizing processing on the video image data from the image processing unit 119. Additionally, the external output interface unit 120 performs signal conversion and imparting of a control signal appropriate to the standard of the external output unit 121, and outputs the control signal to the external output unit 121 such as the SDI terminal and HDMI (registered trademark) terminal.

As described above, in the present embodiment, a configuration is adopted in which the obtained video image is divided into two video image signals paths, one for recording on the recording medium and one for calculating the image shake correction values. Additionally, a configuration is adopted in which a memory that can store the video images for a few seconds is prepared in the video image signal path for recording on a recording medium, and a video image at a timing that has a time axis different from the other video image signal path is provided. Accordingly, a configuration is enabled in which the video image is recorded on the recording medium after undergoing the electronic image stabilization processing by using the image shake correction values calculated based on the future video image up to a few seconds after providing of the video image to the other video image signal path.

Note that, in the present embodiment, although a frame memory is provided at the stage of the RAW image data and the two image processing units for the RAW image data are provided, the image processing immediately before the electronic image stabilization may be performed by using one video image signal path. After adopting this configuration, a frame memory is provided immediately before the electronic image stabilization and two of only the electronic image stabilization processing units are provided, and consequently, the processing similar to that in the present embodiment can be realized. Additionally, a configuration may be adopted in which the electronic image stabilization processing unit is provided only in the video image signal path to the recording medium 105, not in the video image signal path to the display unit 107, and only the previous image shake correction value calculating unit 204 remains. Specifically, a configuration may be adopted in which the electronic image stabilization processing unit 201 and the image shake correction value calculating unit 203 are removed. Additionally, in the present embodiment, although the electronic image stabilization processing by using the cutout control based on the motion vector is used, further appropriate electronic image stabilization processing can be realized by additionally performing image transformation processing with respect to the rotational direction.

By the configuration described above, in shooting, the digital video camera 100 can realize a function that is similar to the image stabilization function in reproducing, can electronically perform the image stabilization by determining the cut-out position of the image based on the vector amount of the image and by enlarging and reproducing the image. That is, as the digital video camera 100 can obtain the vector amount of the image including the image pre-read in the future direction, the digital video camera 100 can distinguish the image shake and the deliberate motion of the photographer, and perform an appropriate image shake correction. Additionally, if the imaging element having a number of pixels larger than that of the pixel for recording is used, electronic enlargement of the image is not necessary, and as a result, deterioration of the image quality may not occur. Furthermore, as a large capacity recording medium for temporarily recording all shot video images also becomes unnecessary, a period for video images to be recorded may not be limited by the capacity of the memory. In addition, as the rendering time is not needed, the user's stress can be reduced.

Second Embodiment

Figure 4:
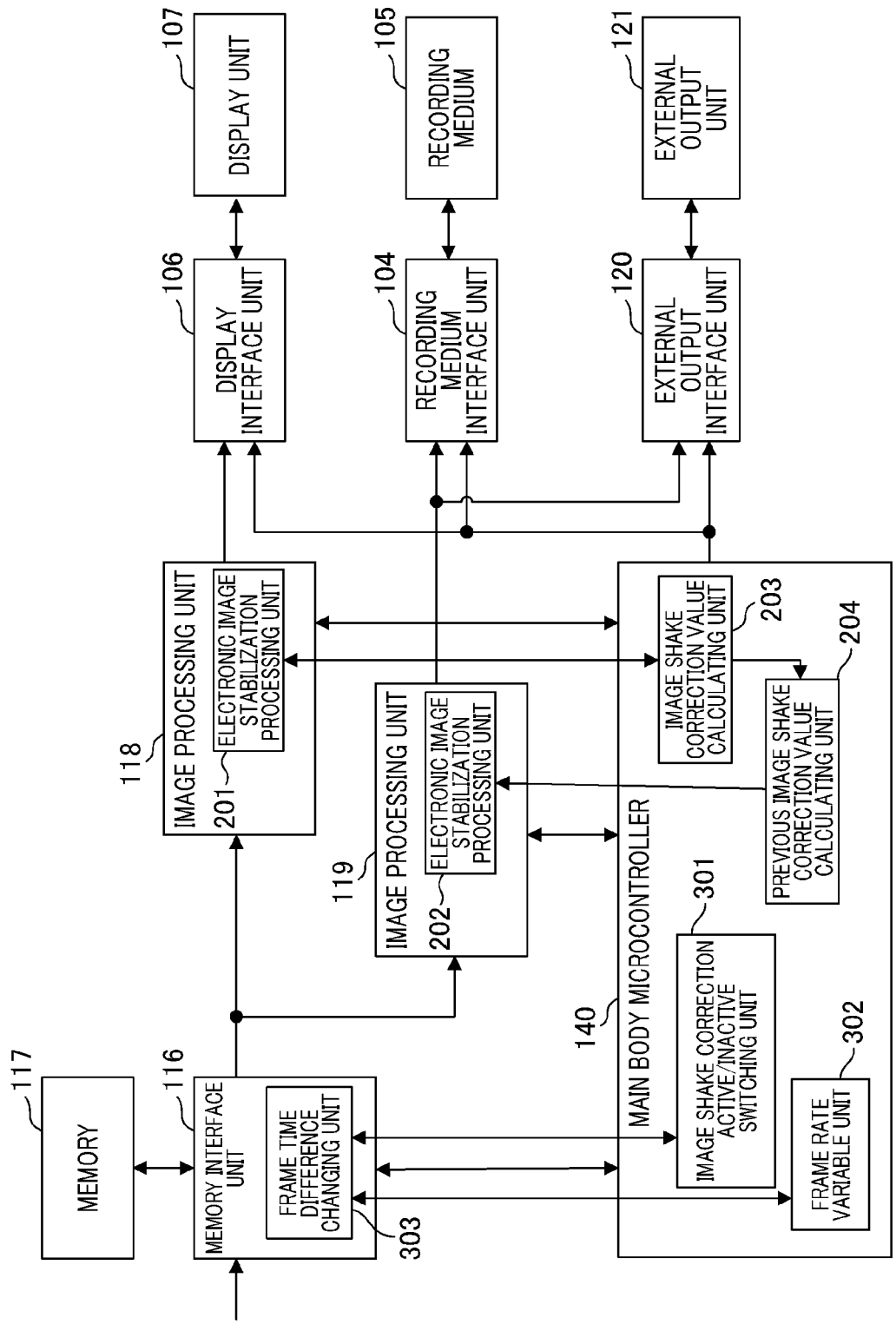
FIG. 4 is a functional block diagram of the image processing apparatus of a second embodiment.

FIG. 4 is a functional block diagram of an image processing apparatus of the second embodiment. The basic configuration of the digital video camera 100 shown in FIG. 4 omits the explanation as the basic configuration of the digital video camera 100 shown in FIG. 4 is the same as that shown in FIG. 3, and a description will be given of only the configuration of the difference.

The main body microcontroller 140 comprises an image shake correction active/inactive switching unit 301. The image shake correction active-inactive switching unit 301 functions as a switching means that switches between the activeness and inactiveness of the image shake correction, in other words, that switches between the activeness and inactiveness of the electronic image stabilization processing units 201 and 202, in accordance with the user's operation. In this embodiment, if the image shake correction active/inactive switching unit 301 switches the electronic image stabilization processing unit 202 to be active, the image shake correction active/inactive switching unit 301 also switches the electronic image stabilization processing unit 201 to be active. Additionally, if the image shake correction active/inactive switching unit 301 switches the electronic image stabilization processing unit 202 to be inactive, the image shake correction active/inactive switching unit 301 also switches the electronic image stabilization processing unit 201 to be inactive. Additionally, the main body microcontroller 140 comprises a frame rate variable unit 302. The frame rate variable unit 302 switches the frame rate in response to the user's operation.

The memory interface unit 116 comprises a frame time difference changing unit 303. The frame time difference changing unit 303 controls the time difference between the frames to be output to the two video image signal paths (which functions as a time difference control means). The frame time difference changing unit 303, for example, changes the time difference between the frame to be output to the image processing unit 118 and the frame to be output to the image processing unit 119.

If the user performs the operation to set the image shake correction to be inactive, the image shake correction active/inactive switching unit 301 switches the electronic image stabilization processing units 201 and 202 to be inactive. Then, the frame time difference changing unit 303 eliminates the time difference between the frame to be output to the first signal path and the frame to be output to the second signal path. The main body microcontroller 140 may set the image shake correction value calculating unit 203 and the previous image shake correction value calculating unit 204 to be inactive. If the user performs the operation to set the image shake correction to be active, the image shake correction active/inactive switching unit 301 switches the electronic image stabilization processing units 201 and 202 to be active. Subsequently, as the frame time difference changing unit 303 provides a time difference between the frame to be output to the first signal path and the frame to be output to the second signal path, control for canceling out the image shake is set to be active.

If the user switches the frame rate, the main body microcontroller 140 controls the frame time difference changing unit 303 to change the time difference between the frames to be output to the image processing units 118 and 119. Additionally, the main body microcontroller 140 sets the image shake correction by the electronic image stabilization processing unit 201 and the electronic image stabilization processing unit 202 to be active to make control for canceling out the image shake active.

FIG. 5 is a flowchart illustrating an example of a process that changes the time difference between the frames to be output to the two video image signal paths, in the second embodiment 2. In this embodiment, the digital video camera 100 can select three types of frame rates, 60P, 30P, and 24P. Additionally, the number of pre-reading frames in the future direction is, for example, needed for one second in real time. Accordingly, for example, in 60P frames, the pre-reading for 60 frames is required.

In step S501, the main body microcontroller 140 determines whether or not the image shake correction is inactive based on the setting of the menu and the like. If the image shake correction is inactive, the process proceeds to step S502. In step S502, the main body microcontroller 140 performs control such that the time difference between the frames to the two video image signal paths is 0. Specifically, the main body microcontroller 140 controls the frame time difference changing unit 303 of the memory interface unit 116 to set a time difference of the frame to be output to the image processing unit 118 and the image processing unit 119 to be 0.

If the image shake correction is active, the process proceeds to step S503. In step S503, the main body microcontroller 140 determines whether or not the currently-set frame rate is 60P. If the currently-set frame rate is 60P, the process proceeds to step S504. In step S504, the main body microcontroller 140 controls the time difference between the frames of two video image signal paths to be 60 frames.

If the currently-set frame rate is not 60P, the process proceeds to step S505. In step S505, the main body microcontroller 140 determines whether or not the currently-set frame rate is 30P. If the currently-set frame rate is 30P, the process proceeds to step S506. Then, in step S506, the main body microcontroller 140 controls the time difference between the frames of two video image signal path to be 30 frames.

If the currently-set frame rate is 24P rather than 30P, the process proceeds to step S507. Subsequently, in step S507, the main body microcontroller 140 controls the time difference between the frames of two video image signal paths to be 24 frames.

In the second embodiment, in a manner similar to the first embodiment, a configuration is adopted in which the obtained video image is divided into two video image signals paths, one for recording on the recording medium and one for calculating the image shake correction values. Additionally, a configuration is adopted in which a memory that can store the images for a few seconds is prepared in the video image signal path for recording on the recording medium and a video image at the timing that has a time-axis that is different from the other video image signal path is provided. Accordingly, a configuration is enabled in which the video image is recorded on the recording medium after undergoing the electronic image stabilization processing by using the image shake correction values calculated based on the future video image up to a few seconds after providing of the video image to the other video image signal path.

Additionally, in the second embodiment, a configuration is adopted in which the activeness/inactiveness of the image shake correction is switchable, and the time difference between the frames are changed depending on the state of the image shake correction. Thus, it is possible to prevent the significant occurrence of the video image delay by invalidating the image stabilization function by the user who also uses the video image signal from the external output unit 121 as the confirmation video image signal. Further, in the second embodiment, a configuration is adopted, in which the frame rate is changeable, and the time difference between the frames is changed in accordance with the frame rate, that is, the number of frames to be pre-read in the future direction is changed. Accordingly, it is possible to prevent the occurrence of the video image delay to the external output unit 121 more than necessary.

Note that in the second embodiment, although the frame memory is provided at the stage of the RAW image data and the two image processing units with respect to the RAW image data are provided, the image processing immediately before the electronic image stabilization may be performed by using one video image signal path. After adopting this configuration, a frame memory is provided immediately before the electronic image stabilization and two of only the electronic image stabilization processing units are provided, and consequently, the processing similar to those in the present embodiment can be realized.

Additionally, a configuration may be adopted in which the electronic image stabilization processing unit is disposed only in the video image signal path to the recording medium 105, not in the video image signal path to the display unit 107, and only the previous image shake correction value calculating unit 204 remains. Specifically, a configuration may be adopted in which the electronic image stabilization processing unit 201 and the image shake correction value calculating unit 203 are removed. Additionally, in the present embodiment, although the electronic image stabilization processing by using the cutout control based on the motion vector is used, further appropriate electronic image stabilization processing can be realized by additionally performing the image transformation processing with respect to the rotational direction.

Third Embodiment

Figure 6B:
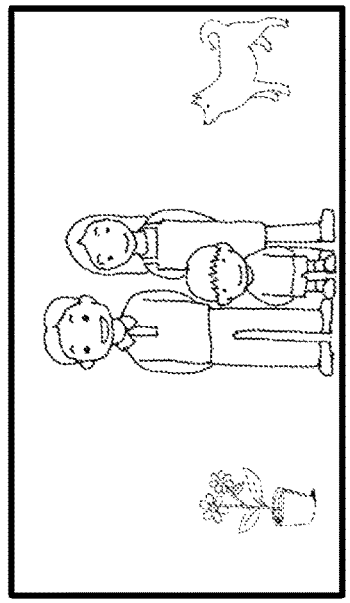
FIGS. 6A to 6C illustrate a display image and an image to be recorded according to video image data.
Figure 6C:
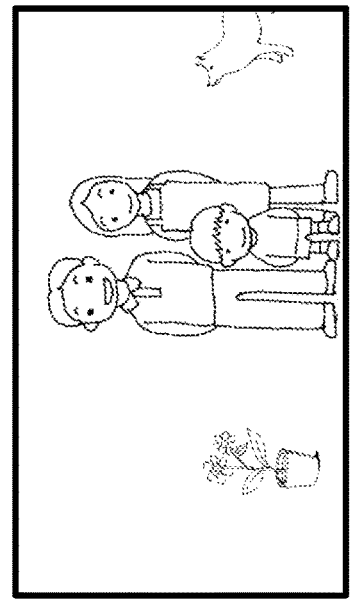
Figure 6A:
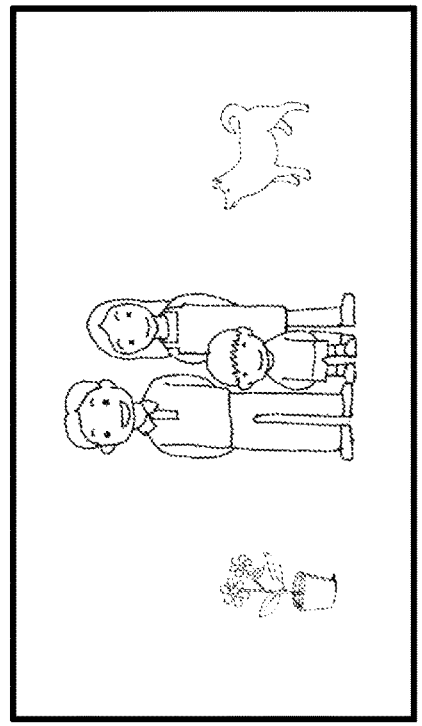

FIGS. 6A to 6C illustrate a display image and an image to be recorded for the video image data. The digital video camera 100 is assumed to have a 3M region as a reading range of the imaging element 102. Additionally, a description will be given in a status in which an image cut into a 2M region is used as an image to be output to the display unit 107, the recording medium 105, and the external output unit 121. In addition, the display unit 107 displays a region that is larger than a region of the video image recorded on the recording medium 105 if the display image is displayed.

FIG. 6A illustrates an image (shot image) according to a RAW image data to be input to the memory interface unit 116. FIG. 6B illustrates a display image to be output to the display unit 107 by the image processing unit 118 through the display interface unit 106. The display image is cut into 2M region by the image processing unit 118. The image processing unit 118 changes the cut-out position based on the image shake correction value. In FIG. 6B, the left side region of the original image is cut out.

FIG. 6C illustrates an image (an image to be recorded) to be output to the recording medium 105 and the external output unit 121 by the image processing unit 119. This image is cut into a 2M region, and the cut-out position of this image is changed based on the image shake correction value at that time. In the image shown in FIG. 6C, the left side region is cut-out as compared with the display image shown in FIG. 6B, and a field angle at which a part of a dog, which is the object, is missing is obtained.

In the examples shown in FIGS. 6A to 6C, the field angle differs in the display image that is used for the confirmation of the object by the user, the image to be actually recorded on the recording medium 105, and the image to be output to the external output unit 121. According to the third embodiment to be described below, it is possible to suppress the divergence of the field angle in the display image, the image to be recorded on the recording medium 105, and the image to be output to the external output unit 121. Note that the process to be described below is applicable to the external display means that displays the video image for the confirmation to the external device, as well as to the display unit 107.

Figure 7B:
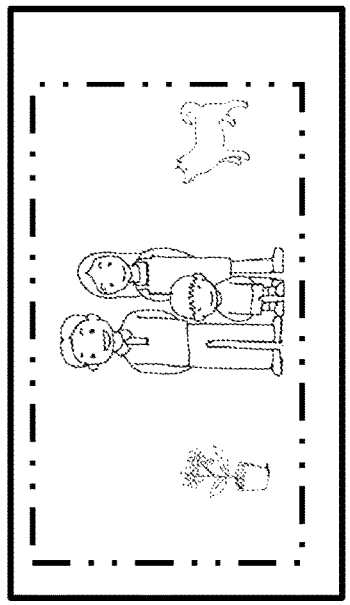
FIGS. 7A to 7C are for explaining an example of a display image in a third embodiment.
Figure 7C:
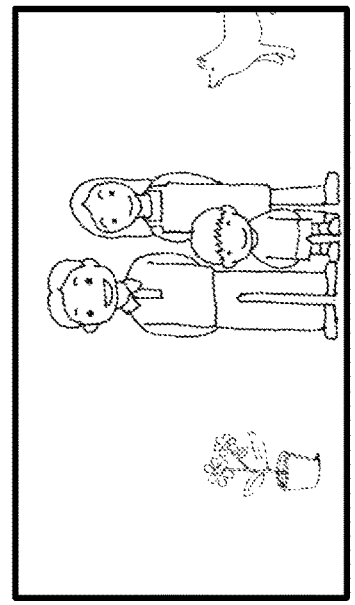
Figure 7A:
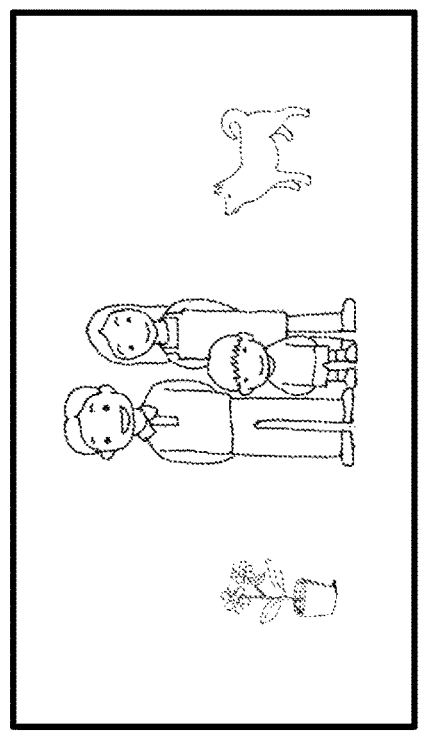

FIGS. 7A to 7C are for explaining an example of a display image in the third embodiment. The read-out range of the imaging element 102 is set to a 3M region. Additionally, the image to be output to the display unit 107, the recording medium 105, and the external output unit 121 is an image cut into a 2M region. FIG. 7A illustrates a shot image of a RAW image data of a 3M region read out by the imaging element 102. As shown in FIG. 7B, the image processing unit 118 outputs a display image of 2M to the display unit 107. A reduction process from a 3M to a 2M is performed at the image processing unit 118. A region surrounded by a dashed-two dotted line in the display image shown in FIG. 7B corresponds to the region to be cut out by the electronic image stabilization processing unit 201. That is, at least one of the display unit 107 and the external display unit displays the information (dashed-two dotted line) indicating a region corresponding to the field angle region of the video image to be recorded on the display image. FIG. 7C illustrates an image (an image to be recorded) of 2M to be output to the recording medium 105 and the external output unit 121 by the image processing unit 119. In the image processing unit 119, based on the image shake correction value calculated by the previous image shake correction value calculating unit 204, the cut-out processing from a 3M to a 2M is performed at the electronic image stabilization processing unit 202.

Figure 8B:
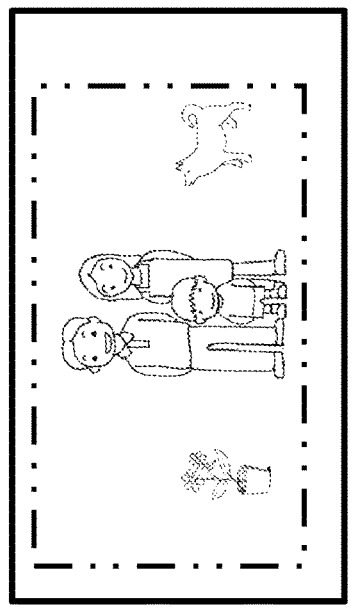
FIGS. 8A to 8C are for explaining another example of the display image in the third embodiment.
Figure 8C:
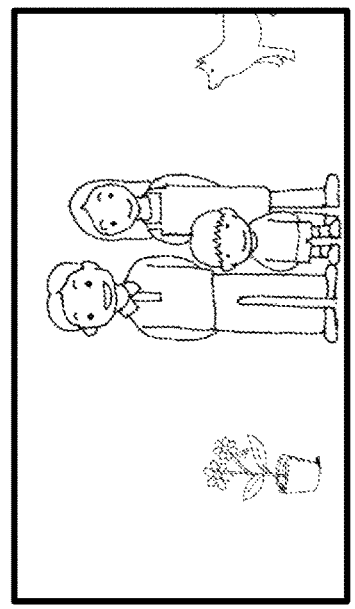
Figure 8A:
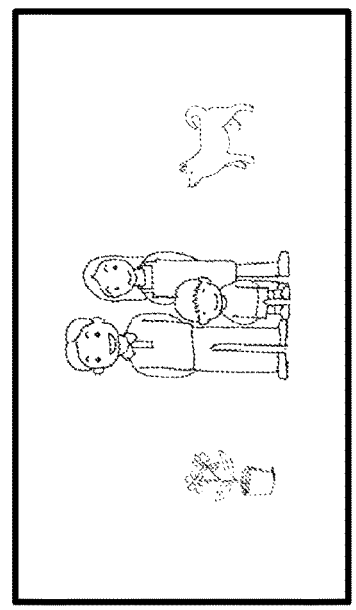

FIGS. 8A to 8C are for explaining another example of the display image in the third embodiment. The read-out range of the imaging element 102 is set to a 2M region. The image to be output to the display unit 107, the recording medium 105, and the external output unit 121 is also set to a 2M region. FIG. 8A illustrates a shot image of a RAW image data of a 2M region read-out by the imaging element 102. As shown in FIG. 8B, the image processing unit 118 outputs a display image of 2M to the display unit 107. A dashed-two dotted line in the display image corresponds to the region to be cut out by the electronic image stabilization processing unit 201.

FIG. 8C illustrates an image (an image to be recorded) of a 2M region to be output to the recording medium 105 and the external output unit 121 by the image processing unit 119. The image processing unit 119 enlarges a 1.5M region cut-out by the electronic image stabilization processing unit 202 to a 2M region based on the image shake correction value calculated by the previous image shake correction value calculation unit 204.

In the third embodiment, at least one of the display unit 107 and the external display means displays a region larger than the field angle region of the image to be recorded, and displays information indicating a region corresponding to the field angle region to be recorded (for example, a rectangular dashed-two dotted line) on the display image. Therefore, the user can determine the region corresponding to a field angle region of the image to be recorded.

Fourth Embodiment

The regions shown by a dashed-two dotted line displayed on the display image in the third embodiment do not coincide with the field angle region that is actually recorded. In the fourth embodiment, the field angle region of the image to be recorded is displayed on the display image as an active region. Accordingly, there is a need to urge the user to perform camera work so as to sufficiently enter the main object inside of the active region. Note that a process to be described below is applicable to the external display means that displays the image for the confirmation on the external device, in addition to the display unit 107.

Figure 9B:
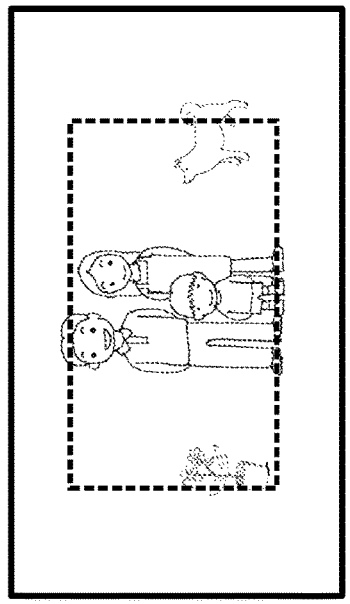
FIGS. 9A to 9C are for explaining an example of a display image in a fourth embodiment.
Figure 9C:
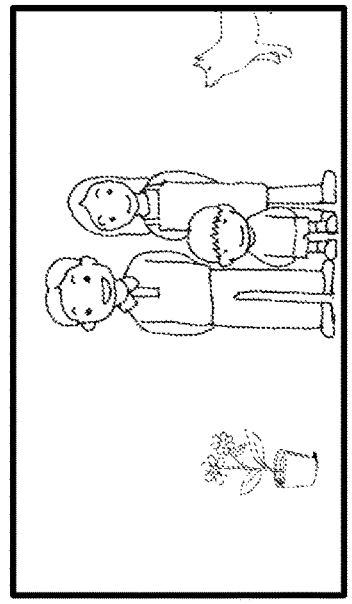
Figure 9A:
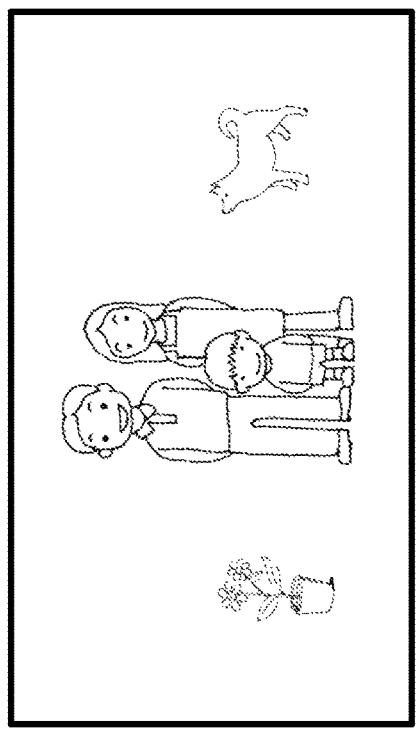

FIGS. 9A to 9C are for explaining an example of a display image according to the fourth embodiment. The read-out range of the imaging element 102 is set to a 3M region. The image to be output to the image output display unit 107, the recording medium 105, and the external output unit 121 is an image cut out in a 2M region. FIG. 9A illustrates a shot image of a RAW image data of a 3M region read out by the imaging element 102.

As shown in FIG. 9B, the image processing unit 119 outputs a display image of a 2M region to the display unit 107. In the image processing unit 118, the reduction processing from a 3M region to a 2M region is performed. The region surrounded by broken lines in the display image shown in FIG. 9B shows the active region, that is, a region within which the filed angle of an image to be recorded is fitted. FIG. 9C illustrates an image (an image to be recorded) of a 2M to be output to the recording medium 105 and the external output unit 121 by the image processing unit 119. In the image processing unit 119, based on the image shake correction value calculated by the previous image shake correction value calculating unit 204, the cut-out processing from a 3M region to a 2M region is performed at the electronic image stabilization processing unit 202.

Figure 10B:
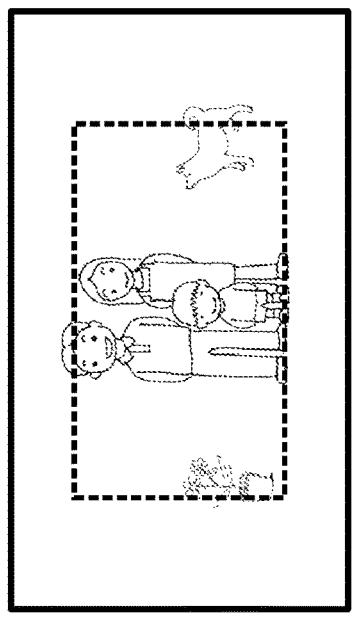
FIGS. 10A to 10C are for explaining another example of the display image in the fourth embodiment.
Figure 10C:
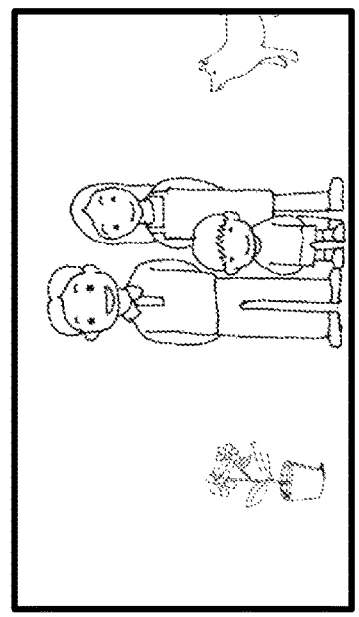
Figure 10A:
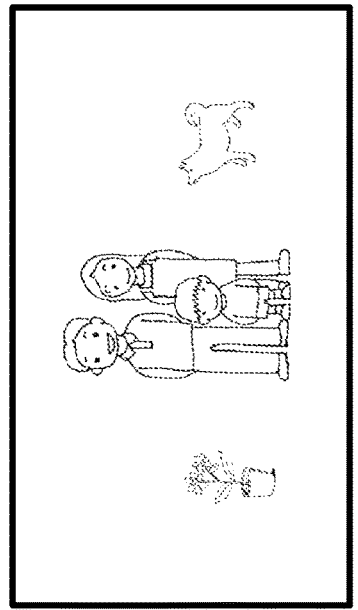

FIGS. 10A to 10C are for explaining another example of the display image in the fourth embodiment. The read-out range of the imaging element 102 is a 2M region. The image to be output to the display unit 107, the recording medium 105, and the external output unit 121 is also set to a 2M region. FIG. 10A illustrates a shot image of a RAW image data of a 2M region read out by the imaging element 102.

As shown in FIG. 10B, the image processing unit 118 outputs a display image of a 2M region. The region surrounded by a broken line in the display image shown in FIG. 10B illustrates the active region, that is, the region within which the filed angle of the image to be recorded is fitted. FIG. 10C is an image to be recorded of a 2M region to be output to the recording medium 105 and the external output unit 121 by the image processing unit 119. The image processing unit 119 enlarges a 1.5M region cut-out by the electronic image stabilization processing unit 202 to a 2M region based on the image shake correction value calculated by the previous image shake correction value calculating unit 204, and outputs the enlarged image.

In the fourth embodiment, at least one of the display unit 107 and the external display means displays a region larger than the region of the image to be actually recorded, and displays the active region on the display image. Consequently, the user can determine a region where the main subject should be put.

According to the first embodiment through the fourth embodiment described above, it is possible to realize a function that is similar to the image stabilization function in reproducing and can electronically correct the image shake in shooting. That is, as the vector amount of images including the image pre-read in the future direction can be obtained, the image shake and a deliberate motion of the photographer can be distinguished, and as a result, it is possible to perform an appropriate image shake correction. Additionally, as a large capacity recording medium for temporarily recording all shot video images is also unnecessary, a configuration can be realized, in which a period for video images to be recorded may not be limited by the capacity of the memory, and rendering time is not necessary. Furthermore, if the imaging element with a number of pixels larger than that of the pixels for recording is used, the electronic enlargement of the image is unnecessary, and as a result, deterioration of the image quality may not occur.

Other Embodiments

Embodiment(s) of the present invention can also be realized by a computer of a system or apparatus that reads out and executes computer executable instructions (eg, one or more programs) recorded on a storage medium (which may also be referred to more fully as a 'non-transitory computer-readable storage medium') to perform the functions of one or more of the above-described embodiment(s) and/or that includes one or more circuits (eg, application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (eg, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-005483, filed Jan. 14, 2016, which is hereby incorporated by reference wherein in its entirety.

What is claimed is:

1. An image processing apparatus includes at least one processor or circuit configured to perform the operations of following units:
    a temporary storage unit configured to temporarily store a video image including a (N-M)-th frame;
    an output control unit configured to output a video image of frames up to N-th frame and later than the (N-M)-th frame, to a first signal path, and output a video image of the (N-M)-th frame that is temporarily stored in the temporary storage unit to a second signal path;
    a first correction amount calculating unit configured to calculate a first correction amount used for correcting an image shake relating to the video image of the (N-M)-th frame based on the video image of the frames up to N-th frame and later than the (N-M)-th frame, output to the first signal path;
    a first image shake correction unit configured to correct the image shake relating to the video image of the (N-M)-th frame by cutting out a predetermined region from the video image of the (N-M)-th frame based on the first correction amount; and
    a recording unit configured to record the (N-M)-th frame, the image shake of which is corrected by the first image shake correction unit;
    wherein the first signal path is connected to a display unit configured to display a video image for confirmation on a main body of the image processing apparatus.

2. The image processing apparatus according to claim 1, further comprising a switching unit configured to switch the first image shake correction unit between active or inactive.

3. The image processing apparatus according to claim 2, further comprising a time difference control unit configured to control a time difference between a frame to be output to the first signal path and a frame to be output to the second signal path,
    wherein if the switching unit switches the first image shake correction unit to be active, the time difference control unit provides the time difference between the frame to be output to the first signal path and the frame to be output to the second signal path, and
    if the switching unit switches the first image shake correction unit to be inactive, the time difference control unit eliminates the time difference between the frame to be output to the first signal path and the frame to be output to the second signal path.

4. The image processing apparatus according to claim 1, further comprising:
    a second correction amount calculating unit configured to calculate a second correction amount used for correcting the image shake relating to the video image of the frames up to N-th frame and later than the (N-M)-th frame based on the video image of the frames up to N-th frame and later than the (N-M)-th frame output to the first signal path; and
    a second image shake correction unit configured to correct the image shake relating to the video image of the frames up to N-th frame and later than the (N-M)-th frame by cutting out a predetermined region from the video image of the first frame based on the second correction amount.

5. The image processing apparatus according to claim 4, wherein if the first image shake correction unit is switched to be active, the second image shake correction unit is also set to be active, and
    if the first image shake correction unit is switched to be inactive, the second image shake correction unit is also set to be inactive.

6. The image processing apparatus according to claim 1, further comprising an external display unit configured to display a video image for confirmation on an external device,
    wherein the external display device is connected to the first signal path.

7. The image processing apparatus according to claim 6, wherein the external display unit displays a region larger than a region of a video image for recording that is recorded through the second signal path if the video image for the confirmation is displayed.

8. The image processing apparatus according to claim 7, wherein the external display unit displays information indicating a region corresponding to the field angle of the video image for recording on the video image for the conformation if the video image for the conformation is displayed.

9. The image processing apparatus according to claim 7, wherein the external display unit displays information indicating a region where the field angle of the recording video image is fitted, on the video image for the confirmation if the video image for the confirmation is displayed.

10. The image processing apparatus according to claim 1, wherein the recording unit is configured to record a video image for recording on the main body of the image processing apparatus,
    wherein the recording unit is connected to the second signal path.

11. The image processing apparatus according to claim 1, further comprising an external output unit configured to output a video image for recording to an external device,
    wherein the external output unit is connected to the second signal path.

12. The image processing apparatus according to claim 1, wherein the display unit displays a region larger than a region of a video image for recording that is recorded through the second signal path if the video image for the confirmation is displayed.

13. The image processing apparatus according to claim 12, wherein the display unit displays information indicating a region corresponding to a field angle of the video image for recording on the video image for the confirmation if the video image for the confirmation is displayed.

14. The image processing apparatus according to claim 12,
wherein the display unit displays information indicating a region where a field angle of the video image for recording is fitted, on the video image for the confirmation if the video image for the confirmation is displayed.

15. An image pickup apparatus comprising an image pickup unit configured to perform photoelectric conversion of an object light and output a signal relating to a video image and serving as an image processing apparatus;
wherein the image processing apparatus includes at least one processor or circuit configured to perform the operations of following unit:
a temporary storage unit configured to temporarily store a video image including a (N-M)-th frame;
an output control unit configured to output a video image of frames up to N-th frame and later than the (N-M)-th frame, to a first signal path and output a video image of the N-M)-th frame that is temporary stored in the temporary storage unit to a second signal path;
a first correction amount calculating unit configured to calculate a first correction amount used for correcting an image shake relating to the video image of the (N-M)-th frame based on the video image of the frames up to N-th frame and later than the (N-M)-th frame, output to the first signal path;
a first image shake correction unit configured to correct the image shake relating to the video image of the (N-M)-th frame by cutting out a predetermined region from the video image of the (N-M)-th frame based on the first correction amount; and
a recording unit configured to record the (N-M)-th frame, the image shake of which is corrected by the first image shake correction unit;
wherein the first signal path is connected to a display unit configured to display a video image for confirmation on a main body of the image processing apparatus.

16. A control method of an image processing apparatus comprising a temporary storage unit configured to temporarily store a video image including a (N-M)-th frame,
wherein the method comprises:
outputting a video image of frames up to N-th frame and later than the (N-M)-th frame, to a first signal path and outputting a video image of the (N-M)-th frame frame that is temporarily stored in the temporary storage unit to a second signal path;
calculating a first correction amount used for correcting an image shake relating to the video image of the (N-M)-th frame based on the video image of the frames up to N-th frame and later than the (N-M)-th frame, output to the first signal path; and
correcting an image shake relating to the video image of the (N-M)-th frame by cutting out a predetermined region from the video image of the (N-M)-th frame based on the first correction amount;
recording the (N-M)-th frame, the image shake of which is corrected by the first image shake correction unit;
wherein the first signal path is connected to a display unit configured to display a video image for confirmation on a main body of the image processing apparatus.

17. An image processing apparatus includes at least one processor or circuit configured to perform the operations of following units:
a temporary storage unit configured to temporarily store a video image including any number of frames;
an output control unit configured to output a video image of a first frame to a first signal path, and output a video image of a second frame that is a frame earlier than the first frame that is temporarily stored in the temporary storage unit to a second signal path;
a first correction amount calculating unit configured to calculate a first correction amount used for correcting an image shake relating to the video image of the second frame based on the video image of the first frame output to the first signal path; and
a first image shake correction unit configured to correct the image shake relating to the video image of the second frame by cutting out a predetermined region from the video image of the second frame based on the first correction amount,
wherein the image processing apparatus further comprises;
a switching unit configured to switch the first image shake correction unit between active or inactive, and
a time difference control unit configured to control a time difference between a frame to be output to the first signal path and a frame to be output to the second signal path, wherein:
if the switching unit switches the first image shake correction unit to be active, the time difference control unit provides the time difference between the frame to be output to the first signal path and the frame to be output to the second signal path, and
if the switching unit switches the first image shake correction unit to be inactive, the time difference control unit eliminates the time difference between the frame to be output to the first signal path and the frame to be output to the second signal path.

18. An image pickup apparatus comprising an image pickup unit configured to perform photoelectric conversion of an object light and output a signal relating to a video image and serving as an image processing apparatus;
wherein the image processing apparatus includes at least one processor or circuit configured to perform the operations of following units:
a temporary storage unit configured to temporarily store a video image including any number of frames;
an output control unit configured to output a video image of a first frame to a first signal path and output a video image of a second frame that is a frame earlier than the first frame that is temporary stored in the temporary storage unit to a second signal path;
a first correction amount calculating unit configured to calculate a first correction amount used for correcting an image shake relating to the video image of the second frame based on the video image of the first frame output to the first signal path; and
a first image shake correction unit configured to correct the image shake relating to the video image of the second frame by cutting out a predetermined region from the video image of the second frame based on the first correction amount,
wherein the image pickup apparatus further includes;
a switching unit configured to switch the first image shake correction unit between active or inactive, and a time difference control unit configured to control a time difference between a frame to be output to the first signal path and a frame to be output to the second signal path, wherein:
if the switching unit switches the first image shake correction unit to be active, the time difference control unit provides the time difference between the frame to be output to the first signal path and the frame to be output to the second signal path, and
if the switching unit switches the first image shake correction unit to be inactive, the time difference control unit eliminates the time difference between the frame to be output to the first signal path and the frame to be output to the second signal path.

19. A control method of an image processing apparatus comprising a temporary storage unit configured to temporarily store a video image including any number of frames, wherein the method comprises:
outputting a video image of a first frame to a first signal path and outputting a video image of a second frame that is a frame earlier than the first frame that is temporarily stored in the temporary storage unit to a second signal path;
calculating a first correction amount used for correcting an image shake relating to the video image of the second frame based on the video image of the first frame output to the first signal path; and
correcting an image shake relating to the video image of the second frame by cutting out a predetermined region from the video image of the second frame based on the first correction amount,
wherein the method further comprises;
switching the correction of the image shake between active or inactive, and
controlling a time difference between a frame to be output to the first signal path and a frame to be output to the second signal path, wherein:
if the image shake correction is switched to be active, the time difference is provided between the frame to be output to the first signal path and the frame to be output to the second signal path, and
if the image shake correction is switched to be inactive, the time difference control unit eliminates the time difference between the frame to be output to the first signal path and the frame to be output to the second signal path.

20. An image processing apparatus includes at least one processor or circuit configured to perform the operations of following units:
a temporary storage unit configured to temporarily store a video image including any number of frames;
an output control unit configured to output a video image of a first frame to a first signal path, and output a video image of a second frame that is a frame earlier than the first frame that is temporarily stored in the temporary storage unit to a second signal path;
a first correction amount calculating unit configured to calculate a first correction amount used for correcting an image shake relating to the video image of the second frame based on the video image of the first frame output to the first signal path; and
a first image shake correction unit configured to correct the image shake relating to the video image of the second frame by cutting out a predetermined region from the video image of the second frame based on the first correction amount,
wherein the image processing apparatus further comprises:
a second correction amount calculating unit configured to calculate a second correction amount used for correcting the image shake relating to the video image of the first frame based on the video image of the first frame output to the first signal path; and
a second image shake correction unit configured to correct the image shake relating to the video image of the first frame by cutting out a predetermined region from the video image of the first frame based on the second correction amount, wherein:
if the first image shake correction unit is switched to be active, the second image shake correction unit is also set to be active, and
if the first image shake correction unit is switched to be inactive, the second image shake correction unit is also set to be inactive.

21. An image pickup apparatus comprising an image pickup unit configured to perform photoelectric conversion of an object light and output a signal relating to a video image and serving as an image processing apparatus;
wherein the image processing apparatus includes at least one processor or circuit configured to perform the operations of following units:
a temporary storage unit configured to temporarily store a video image including any number of frames;
an output control unit configured to output a video image of a first frame to a first signal path and output a video image of a second frame that is a frame earlier than the first frame that is temporary stored in the temporary storage unit to a second signal path;
a first correction amount calculating unit configured to calculate a first correction amount used for correcting an image shake relating to the video image of the second frame based on the video image of the first frame output to the first signal path; and
a first image shake correction unit configured to correct the image shake relating to the video image of the second frame by cutting out a predetermined region from the video image of the second frame based on the first correction amount,
wherein the image pickup apparatus comprises:
a second correction amount calculating unit configured to calculate a second correction amount used for correcting the image shake relating to the video image of the first frame based on the video image of the first frame output to the first signal path; and
a second image shake correction unit configured to correct the image shake relating to the video image of the first frame by cutting out a predetermined region from the video image of the first frame based on the second correction amount, wherein:
if the first image shake correction unit is switched to be active, the second image shake correction unit is also set to be active, and
if the first image shake correction unit is switched to be inactive, the second image shake correction unit is also set to be inactive.

22. A control method of an image processing apparatus comprising a temporary storage unit configured to temporarily store a video image including any number of frames, wherein the method comprises:
outputting a video image of a first frame to a first signal path and outputting a video image of a second frame that is a frame earlier than the first frame that is temporarily stored in the temporary storage unit to a second signal path;

calculating a first correction amount used for correcting an image shake relating to the video image of the second frame based on the video image of the first frame output to the first signal path; and correcting an image shake relating to the video image of the second frame by cutting out a predetermined region from the video image of the second frame based on the first correction amount, wherein the method further comprises;

switching the correction of the image shake between active or inactive, and controlling a time difference between a frame to be output to the first signal path and a frame to be output to the second signal path, wherein:

if the image shake correction is switched to be active, the time difference is provided between the frame to be output to the first signal path and the frame to be output to the second signal path, and if the image shake correction is switched to be inactive, the time difference control unit eliminates the time difference between the frame to be output to the first signal path and the frame to be output to the second signal path.

* * * * *